United States Patent [19]

Anderton

[11] Patent Number: 4,556,281

[45] Date of Patent: Dec. 3, 1985

[54] END PLUG FOR A FIBER OPTIC IN-LINE SPLICE CASE ASSEMBLY

[75] Inventor: John J. Anderton, Oil City, Pa.

[73] Assignee: GTE Products Corporation, Stamford, Conn.

[21] Appl. No.: 562,929

[22] Filed: Dec. 19, 1983

[51] Int. Cl.[4] ............................................. G02B 7/26
[52] U.S. Cl. ................................................. 350/96.20
[58] Field of Search ........................... 350/96.20, 96.21

[56] References Cited

U.S. PATENT DOCUMENTS

| | | | |
|---|---|---|---|
| 4,217,028 | 8/1980 | Reh et al. | 350/96.20 |
| 4,257,674 | 3/1981 | Griffin et al. | 350/96.21 |
| 4,359,262 | 11/1982 | Dolan | 350/96.20 |
| 4,428,645 | 1/1984 | Korbelak et al. | 350/96.20 |
| 4,432,603 | 2/1984 | Morency et al. | 350/96.21 |

FOREIGN PATENT DOCUMENTS 58-97013  6/1983  Japan ............................... 350/96.20

Primary Examiner—John Lee
Attorney, Agent, or Firm—John A. Odozynski; William H. McNeill

[57] ABSTRACT

An end plug is characterized by a pair of rounded surfaces complementary to the interior of a splice case housing and a pair of flat surfaces to which torque bars are fastened. The end plugs exhibit two pairs of apertures extending in an axial direction the length of the end plugs. The larger diameter apertures accommodate the coated glass fibers which may be surrounded by woven protective layers. In practice the protective layers are dressed back and away from the fibers, positioned in lateral cutout portions, and secured by a pair of tie-off screws. In addition, the fiber optic cable will be customarily provided with a reinforcing "wand" running the length of the cable. The wand may be comprised of a strand of steel, fiberglass, copper or other material of suitable tensile strength. The wands are to be dressed through smaller diameter apertures and severed at the other side of the end plugs. A pair of fasteners is provided each of the end plugs in order to secure the wands thereto. The fasteners are in the form of a pair of setscrews that are threaded into bores extending generally radially from the rounded surface toward the interior of the end plugs.

1 Claim, 1 Drawing Figure

U.S. Patent     Dec. 3, 1985     4,556,281
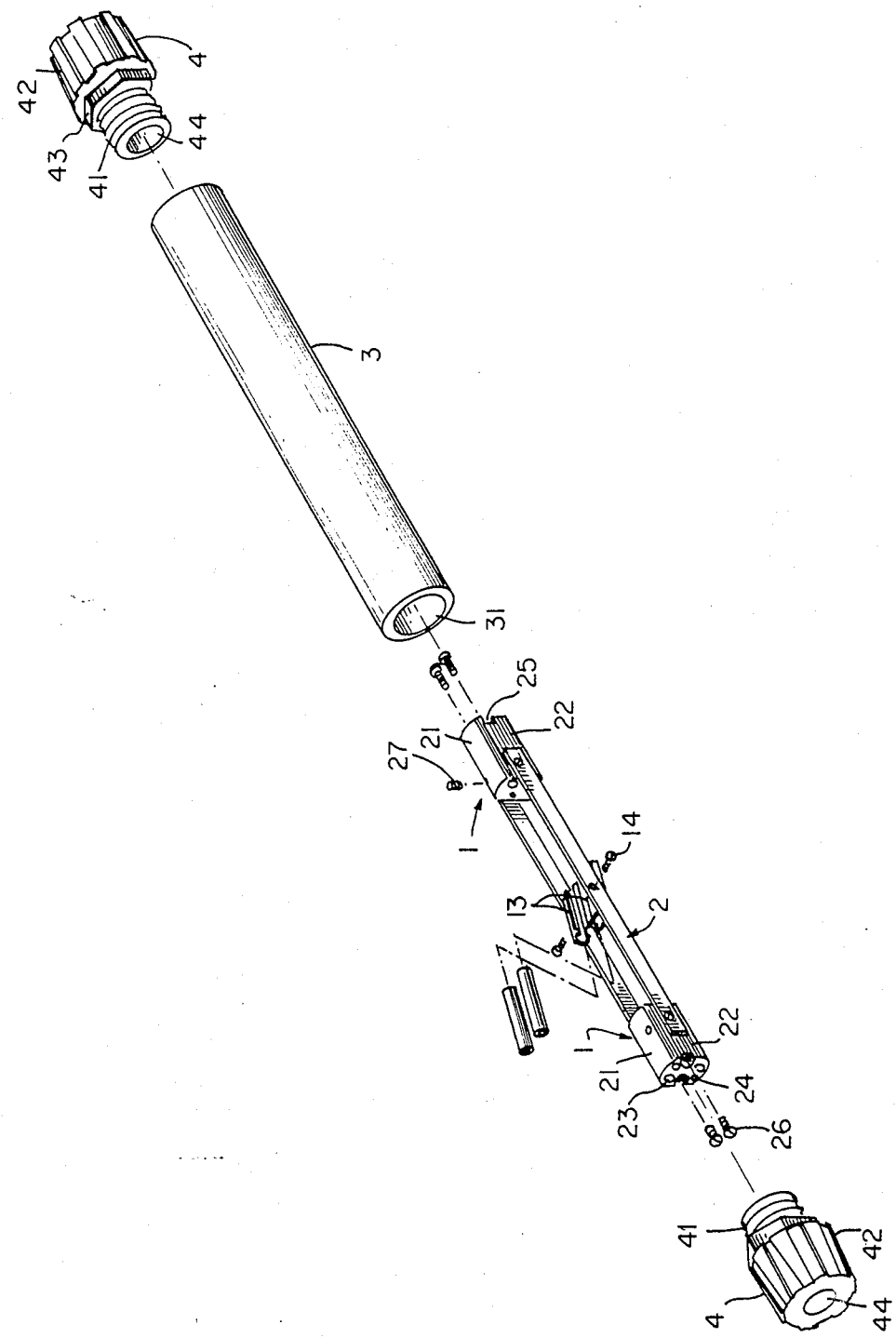

END PLUG FOR A FIBER OPTIC IN-LINE SPLICE CASE ASSEMBLY

TECHNICAL FIELD

The invention relates to fiber optic communication equipment and more particularly, to apparatus for implementing the interconnection of at least two optical fibers.

BACKGROUND OF THE INVENTION

There are many advantages to transmitting light energy via optical fiber waveguides and the use thereof is diverse. Single or multiple fiber waveguides may be used simply for transmitting light to a remote location. Complex communication systems may transmit multiple specific optical signals. These devices often require the coupling of fibers in end-to-end relationship. The coupling is a source of light loss with axial misalignment representing a particularly serious problem. Other factors causing signal loss are angular misalignment of fibers, longitudinal separation of fiber ends and reflection or refraction at the fiber ends.

In response to the need to efficiently couple separate optical fibers, various approaches have evolved. U.S. Pat. No. 4,257,674, "Elastomeric Splice," to Griffin et al is directed to a splice or holder fabricated from an elastomeric material. The substantially cylindrical splice exhibits an axially aligned opening characterized by a diameter smaller than the diameter of the optical fiber. As a fiber is inserted into the opening, the walls of the splice tend to expand. Elastomeric restoring forces exerted on the fiber tend to maintain proper axial alignment. In a preferred embodiment, the axially aligned opening exhibits a triangular cross-section so that contact is made and restoring forces applied to the fiber at three points on its circular cross-section.

The elastomeric splice is emminently suited to effectuate an optical connection between pairs of fibers as might be originally comprised by opposing loose buffer tubes or other cable configurations. The loose buffer tubes generally remind of strawlike structures through which a plurality of cladded fibers are routed. In practice, the tubes may be positioned through or in abutment with a splice casing assembly and the fibers joined in an elastomeric splice, or pair of splices, supported within the case. The case thereby provides protection for and imparts an enhanced degree of ruggedization to the individual fibers. An essential element of the splice case assembly is the subject end plug for positioning the particular fiber cable within the case assembly as described below.

DISCLOSURE OF THE INVENTION

The above and other objects, advantages and capabilities are achieved in one aspect of the invention by an end plug for a splice casing assembly especially suited for, but not restricted to, optical fibers residing in loose buffer tubes.

The end plug is characterized by a pair of rounded surfaces complementary to the interior of a splice case housing and a pair of flat surfaces to which the torque bars are fastened. The end plugs exhibit two pairs of apertures extending in an axial direction the length of the end plugs. The larger diameter apertures accommodate the coated glass fibers which may be surrounded by woven protective layers. In practice the protective layers are dressed back away from the fibers, positioned in lateral cutout portions and secured by a pair of tie-off screws. In addition, the fiber optic cable will be customarily provided with a reinforcing "wand" running the length of the cable. The wand may be comprised of a strand of steel, fiberglass, copper or other material of suitable tensile strength. The wands are to be dressed through smaller diameter apertures and severed at the other side of the end plugs. A pair of fasteners is provided each of the end plugs in order to secure the wands thereto. The fasteners are in the form of a pair of set screws that are threaded into threaded bores extending generally radially from the rounded surface toward the interior of the end plugs.

BRIEF DESCRIPTION OF THE DRAWING

The drawing is an exploded view of a splice case assembly incorporating the subject end plugs.

DESCRIPTION OF A PREFERRED EMBODIMENT

For an understanding of the present invention together with other and further objects, advantages and capabilities thereof, reference is made to the following disclosure and appended claims in conjunction with the above-described drawing.

Referring now to the drawing, the subject splice case assembly is seen to include a pair of somewhat elongated end plugs 1 rigidly joined by elongated, laterally extending torque bars 2. The torque bars may be attached to the end plugs by screws or equivalent fasteners as shown in the drawing.

In practice, end plugs of various configurations, depending on the particular form of optical cable encountered, will be required in order to complete the splice case assembly. This invention however, is specifically directed to end plugs of the type described herein as well as the equivalents.

The end plugs 1 shown in the drawing are characterized by a pair of rounded surfaces 21 complementary to the interior of the splice case housing 3, and a pair of flat surfaces 22 to which the torque bars are fastened. The end plugs exhibit two pairs of apertures 23 and 24 extending in an axial direction the length of the end plugs. The larger diameter apertures 23 accommodate the coated glass fibers which may be surrounded by woven protective layers. In practice, the protective layers are dressed back away from the fibers, positioned in lateral cutout portions 25 and secured by a pair of tie-off screws 26. In addition, the fiber optic cable will customarily be provided with a reinforcing "wand" running the length of the cable. The wand may be comprised of a strand of steel, fiberglass, copper or other material of suitable tensile strength. The wands are to be dressed through smaller diameter apertures 24 and severed at the other side of the end plugs. A pair of fasteners 27 is provided each of the end plugs in order to secure the wands thereto. The fasteners are in the form of a pair of set screws that are threaded into threaded bores extending generally radially from the rounded surface toward the interior of the end plugs.

A pair of splice clips 13 are pivotably fastened to the torque bars via rivets 14. The clips secure elastomeric splices within the splice case and rotate or pivot so that a convenient length of fiber may be run through to the splice and excess fiber length taken up by the rotation of the splice clips.

Upon completion of the splice, the end plugs 1, torque bars 2, splice clips 13 and fibers are surrounded by the substantially cylindrical housing 3. The housing has threaded portions 31 at opposite ends of an interior surface. The splice case assembly is completed by a pair of end caps 4, each exhibiting a threaded portion 41 for fastening to the housing. The end caps 4 also comprise a tapered and grooved gripping portion 42 and an intermediate polygonally perimetered shim portion 43. An axial bore 44 extends the length of each of the end caps and allows the insertion of an optical fiber cable.

As alluded to above, the splice case assembly and subject end plugs have been described herein with reference to anticipated use with a specifically configured cable. Use with cables of varied configurations is, of course, contemplated by the invention. However, variations in cable configurations would presumably require concomitant variations in the splice case assembly. The variations would most likely occur with respect to the subject end plugs and possibly the end caps.

Accordingly, while there has been shown and described what are at present considered the preferred embodiments of the invention, it will be obvious to those skilled in the art that various changes and modifications may be made therein without departing from the scope of the invention as defined by the appended claims.

INDUSTRIAL APPLICABILITY

The subject invention is useful in fiber optic communication and information delivery systems, especially in areas involving the interconnection of two or more optical fibers.

What is claimed is:

1. An end plug for a fiber optic splice case assembly, said end plug comprising:
   a substantially solid body having a longitudinal axis and having a pair of diametrically opposed rounded surfaces, said rounded surfaces having a configuration matching the internal circumference of a splice case housing;
   a pair of flat surfaces, oppositely disposed from one another and orthogonal to and joining said rounded surfaces, said flat surfaces being adapted for the connection of torque bars thereto;
   a first aperture through said end plug, substantially parallel to said longitudinal axis for receiving a glass fiber;
   a second aperture through said end plug, substantially parallel to said longitudinal axis and displaced from said first aperture, for receiving a fiber wand;
   a cutout portion in an end surface of said end plug, said cutout portion being formed to receive a protective layer dressed away from an optical fiber;
   a threaded bore in a rounded surface of said end plug extending radially toward and communicating with said second aperture; and
   a setscrew threaded into said bore for securing said fiber wand in said second aperture.

* * * * *